United States Patent [19]
Buchanan

[11] Patent Number: 5,855,544
[45] Date of Patent: Jan. 5, 1999

[54] FLEXIBLE CONTAINER WITH TUBULAR FITMENT AND METHOD AND APPARATUS FOR ASSEMBLING SAME

[75] Inventor: Jerry E. Buchanan, Acworth, Ga.

[73] Assignee: Technical Developers, Inc., Marietta, Ga.

[21] Appl. No.: 909,647

[22] Filed: Aug. 12, 1997

[51] Int. Cl.⁶ ....................................................... B31B 1/84
[52] U.S. Cl. ........................... 493/102; 493/213; 493/929
[58] Field of Search ............................. 493/87, 102–104, 493/109, 115, 121, 133, 136–140, 152, 153, 189, 210, 212–215, 374, 379, 383, 390–392, 923, 927, 929; 156/212, 213, 216, 221, 228, 250, 581; 383/80, 104, 906; 264/249, 312

[56] References Cited

U.S. PATENT DOCUMENTS

| | | | |
|---|---|---|---|
| 3,054,150 | 9/1962 | Ditmar | 156/221 |
| 3,713,937 | 1/1973 | Eichner | 156/250 X |
| 4,023,607 | 5/1977 | Jensen et al. | 150/1 |
| 4,049,034 | 9/1977 | Vceika et al. | 150/8 |
| 4,695,337 | 9/1987 | Christine | 156/69 |
| 4,746,025 | 5/1988 | Krautkramer et al. | 215/232 |
| 4,783,176 | 11/1988 | Ichikawa | 383/80 |
| 4,836,691 | 6/1989 | Suzuki et al. | 493/929 X |
| 5,002,623 | 3/1991 | Steer et al. | 156/221 |
| 5,033,867 | 7/1991 | Peppiatt | 383/29 |
| 5,152,438 | 10/1992 | Gordon et al. | 222/546 |
| 5,226,564 | 7/1993 | Steer et al. | 222/107 |
| 5,348,182 | 9/1994 | Luch | 220/256 |
| 5,348,525 | 9/1994 | Buchanan | 493/213 |
| 5,473,857 | 12/1995 | Keeler | 53/410 |
| 5,484,375 | 1/1996 | Owensby et al. | 493/212 X |
| 5,597,082 | 1/1997 | Luch et al. | 215/44 |

Primary Examiner—Joseph J. Hail, III
Assistant Examiner—Anthony Ojini
Attorney, Agent, or Firm—Kennedy, Davis & Kennedy, P.C.

[57] ABSTRACT

A method and apparatus is disclosed for mounting constructing a flexible a tubular fitment (10) to a flexible container (11) and to the resulting product. The fitment is mounted upon a mandrel (24) having an extendable bearings in the form of an annular array of balls (27). The mandrel supporting the fitment is positioned within the container body (11) and the assembly positioned in heat sealing dies (33,34) having an annular channel (35) sized to receive the fitment. The dies have a groove (36) extending from the channel. The balls are then outwardly extended into the groove and the mandrel rotated to cause the balls to orbit in a circle and seal the fitment to the flexible container oven an annular protrusion (38).

25 Claims, 5 Drawing Sheets

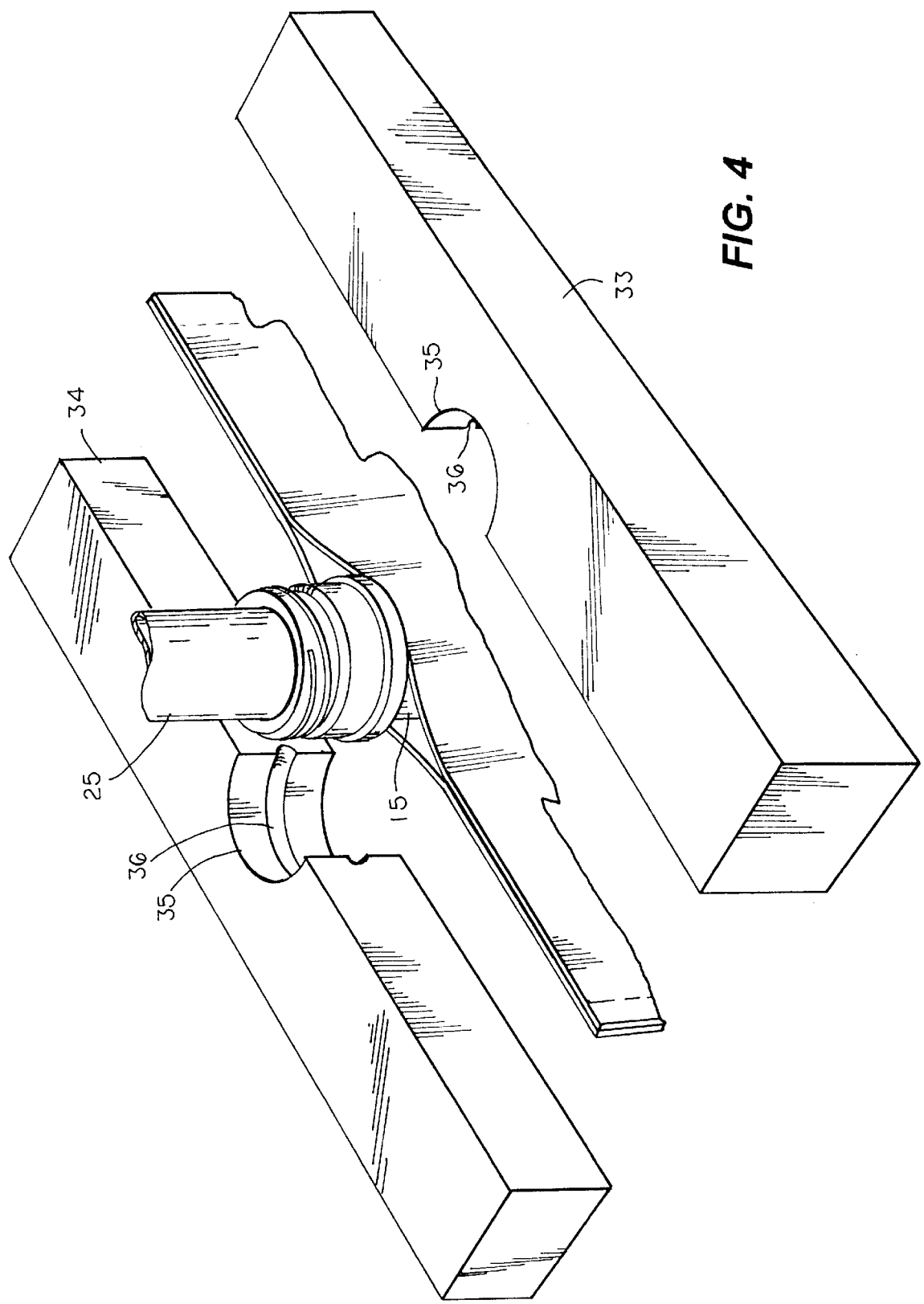

FLEXIBLE CONTAINER WITH TUBULAR FITMENT AND METHOD AND APPARATUS FOR ASSEMBLING SAME

TECHNICAL FIELD

This invention relates generally to containers and more specifically to flexible containers having fitments and to methods and apparatuses for assembling such containers.

BACKGROUND OF THE INVENTION

Containers made of flexible materials which hold and dispense liquids and granular material have been designed with spouts from which their contents are poured. Some of these containers are constructed by mounting an independent spout, more generally referred to as a fitment, to the body of the container as shown in U.S. Pat. No. 5,002,623. Such a fitment typically has a base from which a neck or spout extends. The neck may be provided with threads so that a cap may be threaded thereon to close the container.

Fitments have been designed to be heat welded to the outside surface of the body of the container about an opening. However, because of the flexibility of these containers these types of fitments are susceptible to separation from the body during container handling.

Fitments have also been designed to be mounted in an opening between two layers of plastic which form opposite sides of the container body. The opening is formed by sealing all but a portion of the side edges of the plastic layers as shown in U.S. Pat. No. 5,002,623. The fitment is mounted on a mandrel which is inserted into the opening. Once the fitment is inserted the remaining side edges of the plastic layers are sealed about the fitment base with the mandrel supporting the fitment against the pressure of the sealing plate. The sealing process may be done by heat welding, as shown in U.S. Pat. No. 4,023,607, or by any other commonly used welding processes.

Fitments for flexible containers have also been designed with bases that are larger in diameter than their necks so that the container bodies do not have to taper severely towards the fitment. This type of fitment aids in pouring by funneling the contents. However, because the fitment neck is narrower than its base a mandrel positioned through the neck cannot also fit flushly against the interior of the base during the sealing process since it could not thereafter be removed through the restricted neck. Therefore these fitments have been designed with thicker bases to endure the pressure of the sealing plate without deformation. Nevertheless, these thicker plastic fitments still tend to flex during sealing which oftentimes results in a defective seal. Additionally, the increased thickness of these fitments increases the quantity of plastic used in their construction thus increasing their weight and cost.

Fitments have also been designed with ridges along the exterior of their bases. During assembly the fitment is positioned upon a mandrel extending through the base which is flush with the interior of the fitment. The flexible material is positioned over the ridges during the welding process to aid in securing the fitment. However, these ridges increase the width of the fitment base as compared to the portions adjacent the ridges. This difference in material width causes an uneven transfer of heat to and through the fitment. The uneven heat transfer causes an uneven sealing of the fitment.

It thus is seen that a need remains for a method and apparatus for mounting a fitment of the type having a spout and base to flexible container body and to the resulting container. It is to the provision of such that the present invention is primarily directed.

SUMMARY OF THE INVENTION

In a preferred form of the invention, there is shown a container and method and apparatus of producing such having a tubular fitment with a spout and a mounting skirt depending from the spout to a flexible container body. The method comprises the steps of positioning the fitment mounting skirt within the container body with the spout positioned outside of the container body. The fitment mounting skirt and a portion of the container body adjacent the mounting skirt is positioned between heat sealing dies that have a channel sized and shaped to receive the fitment and a portion of the container body and an annular groove in the channel. A mandrel having a generally cylindrical shaft and at least one radially movable bearing is positioned within the fitment with the bearing aligned with the annular groove. The bearing is extended radially outwardly from the mandrel shaft against the interior of the mounting skirt thereby forcing the mounting skirt against the container body and the container body into the sealing dies groove. The mandrel is then rotated along the groove thereby forming an annular detent in the mounting skirt and container body adjacent the mounting skirt. The mandrel is removed from the fitment and releasing the fitment and container body from the sealing dies.

In another preferred form of the invention, a container is produced by positioning a fitment having a spout and a mounting skirt of a generally uniform width within a container body formed of a flexible sheet material with a mounting portion overlaying the fitment mounting skirt. An annular detent is formed in the mounting skirt and mounting portion which extends outwardly from two straddling portions, the annular detent and the straddling portions having a uniform width. A sealing heat is applied to the detent and straddling portions. The uniform width of the detent and straddling portions allows the uniform transferring of sealing heat therethrough.

In another preferred form of the invention, an apparatus for use in mounting a tubular fitment to a flexible container comprises a mandrel sized and shaped to be inserted into a tubular fitment. The mandrel has an elongated shaft and a bearing mounted for reciprocal movement between an extended position extending outwardly from the shaft and a retracted position generally retracted within the shaft. The mandrel is rotatably driven about an axis extending through the shaft. The apparatus also includes sealing dies that have a channel sized and shaped to receive a portion of the tubular fitment and a portion of a flexible container. The channel has an annular groove. The bearing and the annular groove are alignable with each other. With this construction, movement of the bearing to its extended position forces the fitment annular portion against the portion of the flexible container and the flexible container into the annular groove of the sealing dies. Rotation of the bearing causes continuous contact of the fitment annular portion against the portion of the flexible container and the flexible container into the annular groove along the entire annular groove.

BRIEF DESCRIPTION OF THE DRAWINGS

FIGS. 2–5 are perspective views of a fitment being mounted to a flexible container in progressive stages in accordance with principles of the invention in a preferred form.

DETAILED DESCRIPTION

Figure 1:
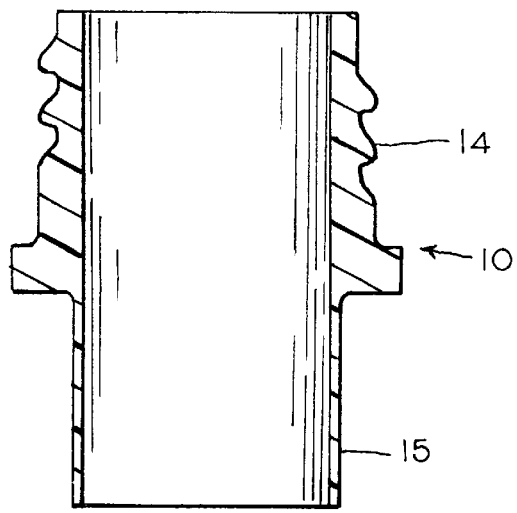
FIG. 1 is a cross-sectional view of a fitment used in preforming a method of the invention in a preferred form.

With reference next to the drawings, there is shown a method of mounting a tubular fitment 10 to the body 11 of flexible container 12. The fitment 10 has a threaded neck or spout 14 and a mounting skirt 15 that extends coaxially from the spout 14. The mounting skirt 15 is of a generally uniform thickness, preferably 20 mils in width. The flexible container body 11 is formed of a sheet of flexible material preferably of two ply construction having an inner layer of thermally bondable polyethylene and an outer layer of strong, relatively non-thermally bondable, imprintable nylon or polyester. A cap may be threaded onto the fitment spout 14 to close the container.

In mounting the fitment 10 to the container body 11 having an open top 21 defined by two overlaying sides 19 and 20 joined along side seals 18. The inner, thermally bondable layers face each other. The top 21 defines the upper limit of a mounting portion 22 of the container body which is sealed to the fitment. To achieve this folded configuration the sheet material may be folded as shown in U.S. Pat. No. 5,135,464. For illustrative purposes only, a single container portion of a continuous web of sheet material is shown.

Figure 7:
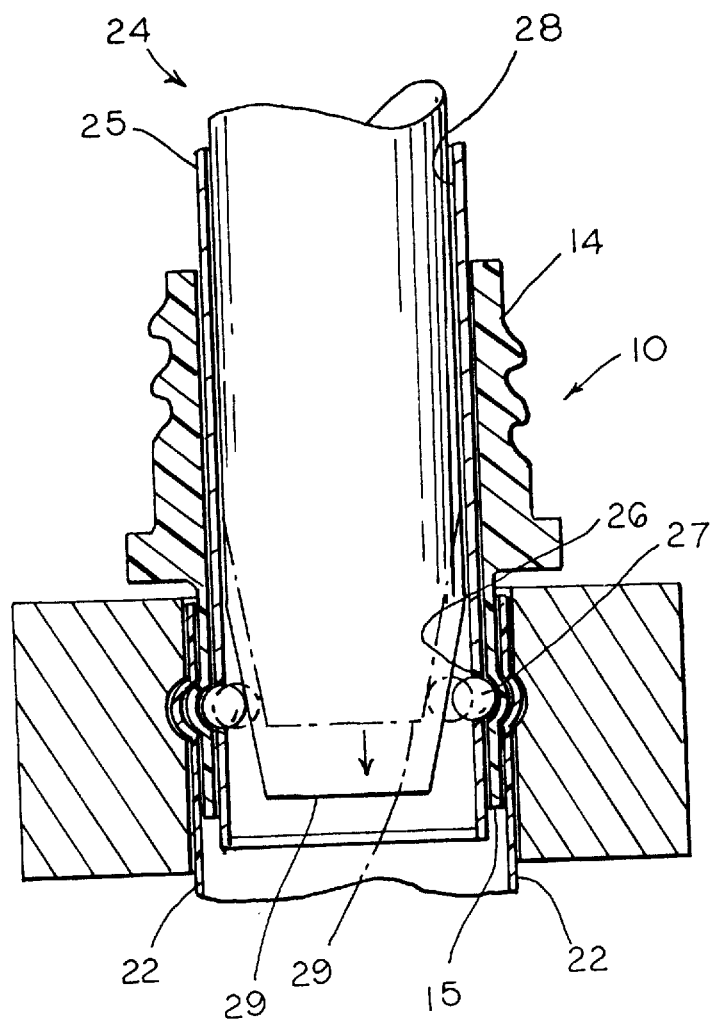
FIG. 7 is a cross-sectional view of the mandrel positioned within the fitment as shown in FIG. 5.

The tubular fitment 10 is mounted upon a mandrel 24 which is coupled to a motor M for rotational movement thereof. The mandrel 24 has a generally cylindrical shaft 25 with an annular array of openings 26 each of which has a ball 27 movably mounted therein, as shown in detail in FIG. 7. The mandrel shaft 25 has a channel 28 therethrough in communication with the openings 26 and a bearing cam 29 mounted for reciprocal movement within the channel. The bearing cam 29 is configured to be moved between an upper position allowing the balls to be retracted into the shaft against the bearing cam, as shown in phantom lines in FIG. 7, and a lower position bearing upon the balls 27 so as to force a portio of the balls to be extended beyond the outer surface of the shaft, as also shown in FIG. 7, and into an annular groove described in detail hereinafter. The fitment is mounted upon the mandrel with the mandrel bearing cam 29 in its upper position so that the balls 27 do not apply a bearing force upon the mandrel skirt. The mandrel annular array of balls 27 are positioned approximately along the middle of the fitment mounting skirt 15.

Figure 3:
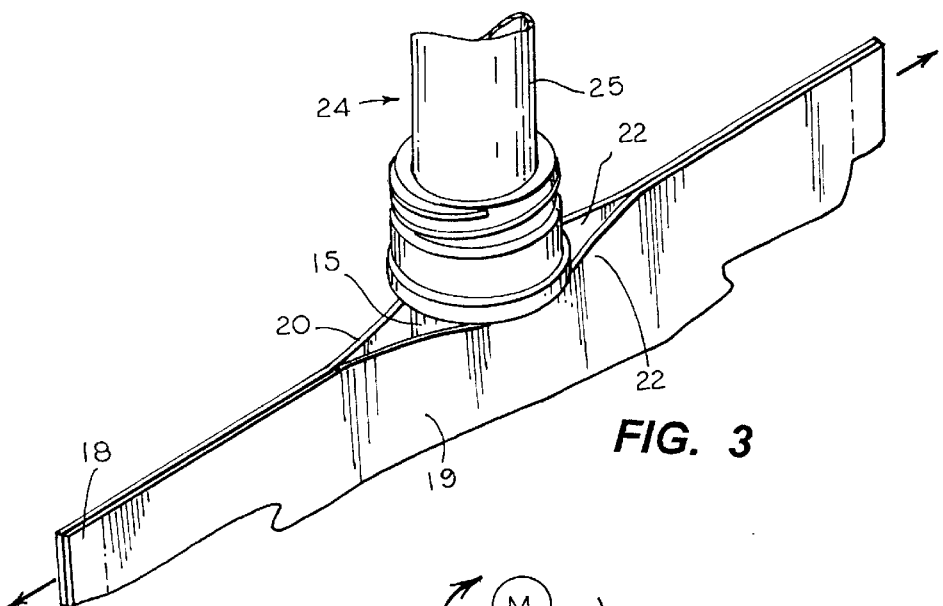
Figure 5:
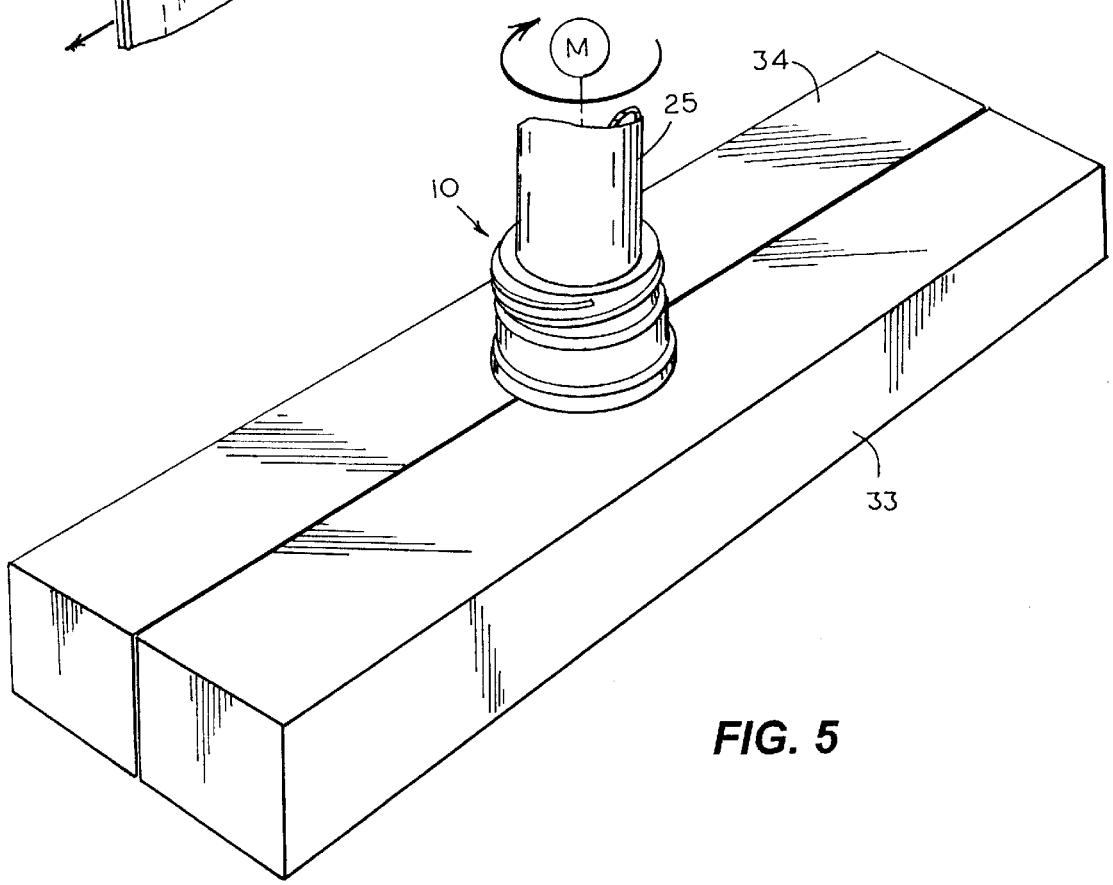
Figure 6:
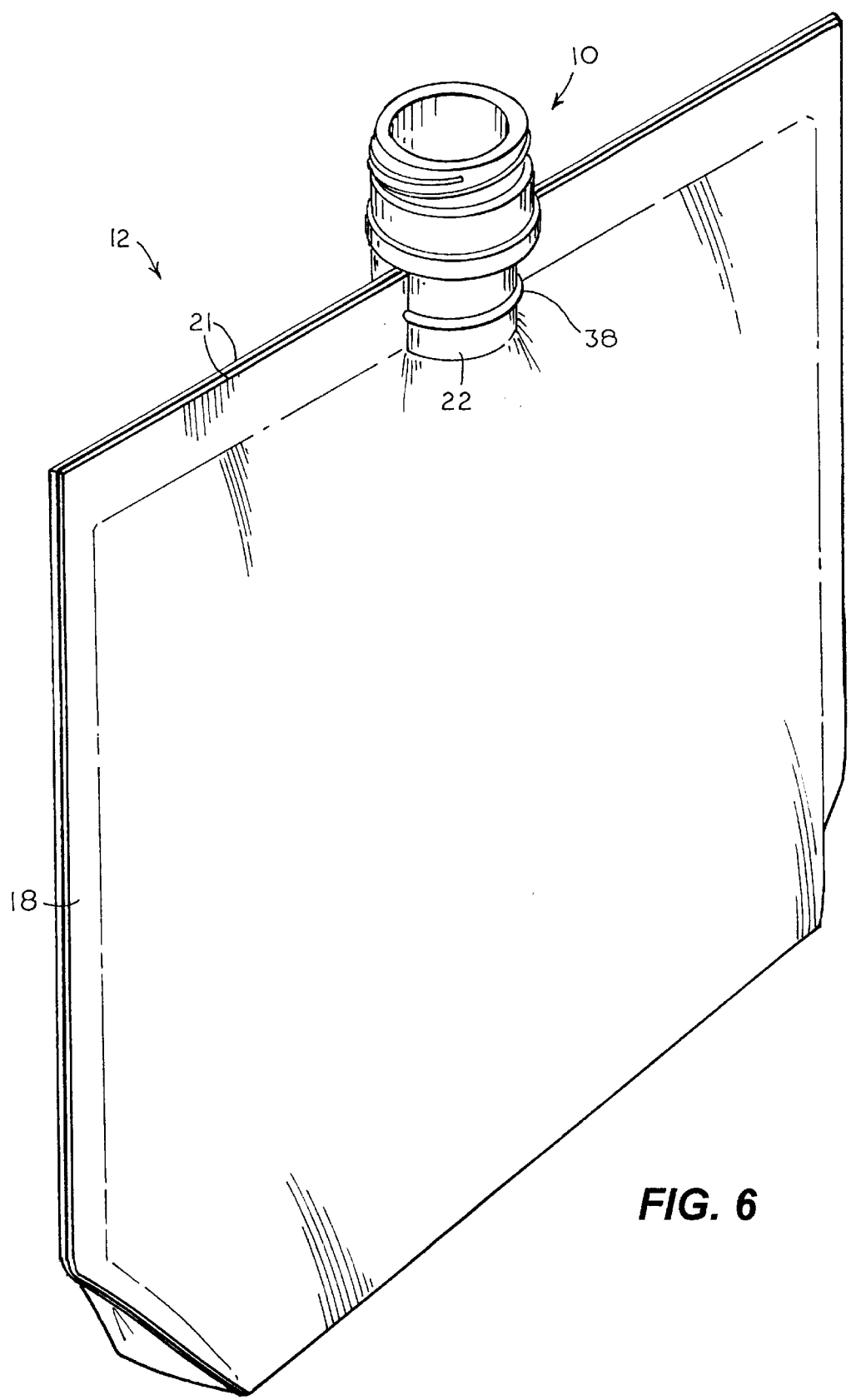
FIG. 6 is a perspective view of the finished container made in accordance with the method shown in FIGS. 2–5.

The mandrel is positioned so as to place the fitment mounting skirt 15 between the mounting portions 22 of the open container body 11. The mounting portions of the side walls are then forced closely about the fitment mounting skirt 15 by forcing the side seals 18 in opposite directions, as shown in FIG. 3. Sealing is performed with a pair of heat sealing dies 33 and 34 forming a cylindrical channel 35 therethrough with an annular groove 36 extending radially outwardly from the cylindrical channel 35. The two dies are forced towards each other capturing the fitment mounting skirt 15 and mounting portion 22 within the channel 35, as shown in FIG. 5. With the sealing dies heated to a desired sealing temperature, the mandrel bearing cam 29 is moved to its lower position forcing the bearing balls 27 outward, as shown in FIG. 7. This outward movement of the balls forces the fitment mounting skirt into contact with the mounting portions 22 of the container body and forces the mounting portions 22 into the annular groove 36 of the sealing dies. With the bearing balls 27 extended, the mandrel is rotated by motor M about its longitudinal axis so that the bearing balls orbit about a circular path about the axis, as shown in FIG. 5. The balls move along the annular groove thereby forcing an annular portion of mounting skirt 15 against the mounting portion 22 of the container body and into the annular groove 36 along its entire circumference or length. This action forms an annular protrusion 38 in the fitment mounting skirt and container body mounting portions. The sealing dies also seal the top of the container body so that a continuous seal is formed along the top of the container which extends integrally from the side seals of the container.

Figure 2:
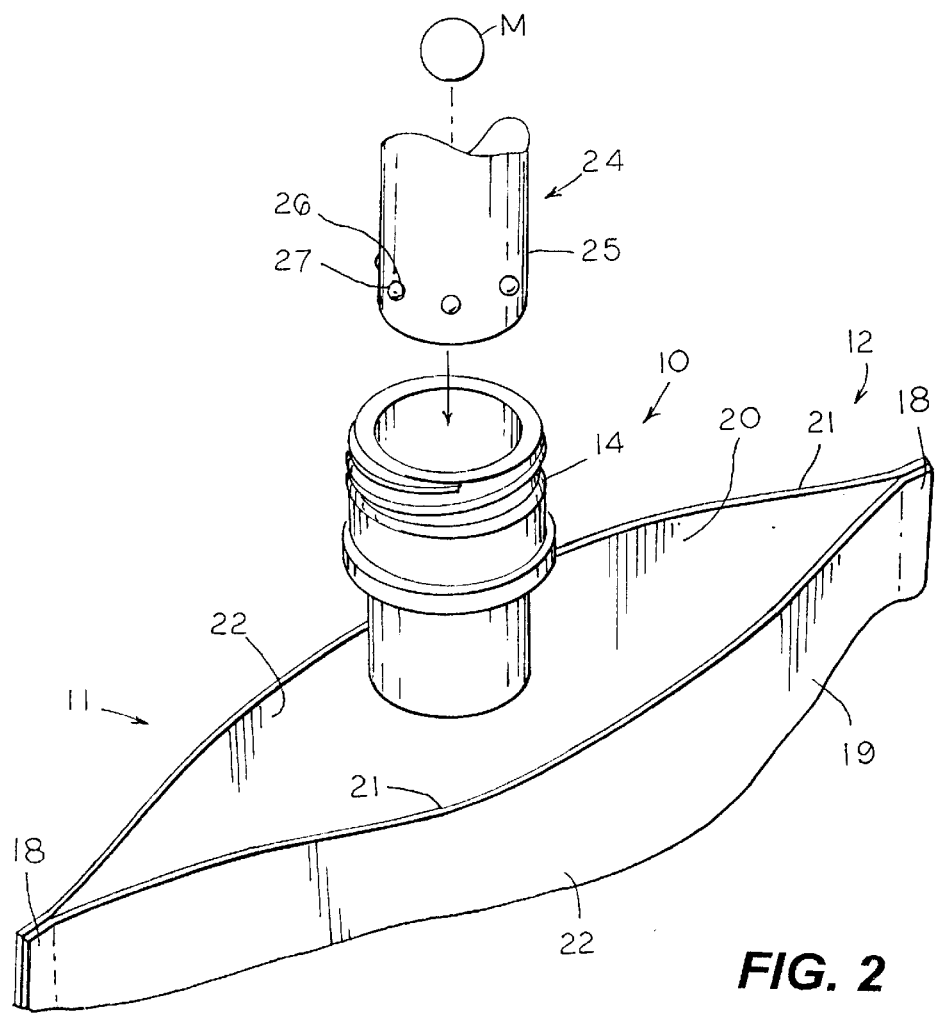

The mandrel is then removed from within the fitment and the sealing dies separated to release the finished container as shown in FIGS. 2 and 4. The annular sealing protrusion 38 of the container aids in maintaining a sealing engagement between the container body and the fitment. It also aids in preventing the fitment from being pulled loose of the container body.

Preferably the mounting skirt material has a uniform thickness. This uniform thickness allows heat transfer between the sealing dies and the mandrel to be uniform. Conversely, fitments of the prior art included a mounting portion with a ring or bulge that tended to cause uneven sealing due to variations in heat transfer characteristics.

Fitments of various types and shapes may be used so long as they include a mounting skirt. For example, the fitment may have a top portion with the shown threaded neck and cap or a push-pull closure commonly used with containers of liquid detergent or flip-up lid. It should also be understood that any outwardly extending bearing surface may to used as an alternative to the annular array of balls, provided it is capable of exerting a pressure against the interior of the fitment mounting skirt.

It should be understood that the method could be modified so that the fitment is positioned within the container body prior to the insertion of the mandrel. As such, the mandrel would be inserted into the fitment once the sealing dies have been closed upon the fitment, i.e. the closing of the sealing dies shown in FIG. 5 would precede the insertion of the mandrel shown in FIG. 2. It should also be understood that the cam may be replaced by other types of ball movement means, such as hydraulics systems, pneumatics systems or mechanical linkages coupled to the ball or other type of bearing surface.

From the foregoing, it is seen that a container having a fitment, a method of mounting a fitment to a container body, and an apparatus for mounting a fitment to a container body are now provided which overcome problems long associated with those of the prior art. It should however be understood that the just described embodiment merely illustrates principles of the invention in its preferred form. Many modifications, additions and deletions may, of course, be made thereto without departure from the spirit and scope of the invention as set forth in the following claims.

I claim:

1. A method of mounting a tubular fitment having a spout and a mounting skirt depending from the spout to a flexible container body, with the method comprising the steps of:

(a) positioning the fitment mounting skirt within the container body with the spout positioned outside of the container body;

(b) positioning the fitment mounting skirt and a portion of the container body adjacent the mounting skirt between heat sealing dies that have a channel sized and shaped to receive the fitment and a portion of the container body and an annular groove in the channel;

(c) positioning a mandrel having a generally cylindrical shaft and at least one radially movable bearing within the fitment with the bearing aligned with the annular groove;

(d) extending the bearing radially outwardly from the mandrel shaft against the interior of the mounting skirt thereby forcing the mounting skirt against the container body and the container body into the sealing dies groove;

(e) rotating the mandrel bearing along the groove thereby forming an annular protrusion in the mounting skirt and container body adjacent the mounting skirt; and (f) removing the mandrel from the fitment and releasing the fitment and container body from the sealing dies.

2. The method of claim 1 wherein the fitment mounting skirt is positioned within the container body with the spout positioned outside of the container body; then positioning the fitment mounting skirt and a portion of the container body adjacent the mounting skirt between heat sealing dies that have a channel sized and shaped to receive the fitment and a portion of the container body and an annular groove in the channel; then positioning a mandrel having a generally cylindrical shaft and at least one radially movable bearing within the fitment with the bearing aligned with the annular groove; then extending the bearing radially outwardly from the mandrel shaft against the interior of the mounting skirt thereby forcing the mounting skirt against the container body and the container body into the sealing dies groove; then rotating the mandrel bearing along the groove thereby forming an annular protrusion in the mounting skirt and container body adjacent the mounting skirt; and then removing the mandrel from the fitment and releasing the fitment and container body from the sealing dies.

3. The method of claim 1 wherein a mandrel having a generally cylindrical shaft and at least one radially movable bearing is positioned within the fitment with the bearing aligned with the annular groove; and a ball is aligned with the annular groove and wherein the bearing is extended radially outwardly from the mandrel shaft against the interior of the mounting skirt thereby forcing the mounting skirt against the container body and the container body into the sealing dies groove; and the ball is extended outwardly from the mandrel shaft.

4. The method of claim 3 wherein a mandrel having a generally cylindrical shaft and at least one radially movable bearing is positioned within the fitment with the bearing aligned with the annular groove; and an annular array of balls is positioned in alignment with the annular groove and wherein the annular array of balls is extended outwardly from the mandrel shaft.

5. The method of claim 1 wherein the bearing is cammed outwardly from the mandrel shaft against the interior of the mounting skirt thereby forcing the mounting skirt against the container body and the container body into the sealing dies groove.

6. A product produced in accordance with the method of claim 1.

7. A product produced in accordance with the method of claim 1.

8. A method of mounting a tubular fitment to a container body formed of flexible material, with the method comprising the steps of:

(a) inserting a mandrel having an elongated shaft and a bearing extendable between a retracted position and an extended position into a tubular fitment having a neck and a mounting skirt having an annular portion;

(b) positioning the mandrel having the fitment thereon between heat sealing dies that have a channel with an annular groove in the channel;

(c) surrounding an annular portion of the fitment mounting skirt and a portion of the container body adjacent the fitment mounting skirt within the channel of the sealing dies with the mandrel bearing aligned with the annular groove; and (d) outwardly extending the mandrel bearing to its extended position and rotating the mandrel bearing along the groove so as to force the mounting skirt into contact with the container body and the container body into the groove along the entire length of the groove.

9. The method of claim 8 wherein a mandrel having an elongated shaft and a bearing extendable between a retracted position and an extended position is inserted into a tubular fitment having a neck and a mounting skirt having an annular portion; then positioning the mandrel having the fitment thereon between heat sealing dies that have a channel with an annular groove in the channel; then surrounding an annular portion of the fitment mounting skirt and a portion of the container body adjacent the fitment mounting skirt within the channel of the sealing dies with the mandrel bearing aligned with the annular groove; and then outwardly extending the mandrel bearing to its extended position and rotating the mandrel bearing along the groove so as to force the mounting skirt into contact with the container body and the container body into the groove along the entire length of the groove.

10. The method of claim 8 wherein an annular portion of the fitment mounting skirt and a portion of the container body adjacent the fitment mounting skirt are surrounded with the channel of the sealing dies with the mandrel bearing and a ball is aligned with the annular groove.

11. The method of claim 8 where the mandrel bearing is cammed outwardly to its extended position and the mandrel bearing is rotated along the groove so as to force the mounting skirt into contact with the container body and the container body into the groove along the entire length of the groove.

12. The method of claim 11 wherein an annular portion of the fitment mounting skirt and a portion of the container body adjacent the fitment mounting skirt are surrounded within the channel of the sealing die with the mandrel bearing aligned with the annular groove, and an annular array of balls is aligned with the annular groove.

13. A container produced according to the method that comprises the steps of:

forming a container body from a web of flexible sheet material;

mounting a fitment having a spout and a mounting skirt of a uniform thickness upon a mandrel;

positioning the fitment mounting skirt and a portion of the container body adjacent the mounting skirt within sealing dies that have a channel sized and shaped to receive the fitment mounting skirt and container body an annular groove sized to receive a portion of the container body; and forcing a portion of the container body into the annular groove while transferring heat between the mandrel and sealing dies through the mounting skirt and container body so as to form a heat seal having an annular protrusion extending from and straddled by two adjacent portions, the protrusion and the two adjacent portions having the same selected thickness, the container body being forced into the groove by extending a portion of the mandrel towards the annular groove and rotating the extended portion of the mandrel.

14. A container produced according to the method that comprises the steps of:

positioning a fitment having a spout and a mounting skirt of a generally uniform thickness within a container body formed of a flexible material with a mounting portion overlaying the fitment mounting skirt;

forming an annular protrusion in the mounting skirt and mounting portion which extends outwardly from two straddling portions by forcing the mounting portion into an annular groove within sealing dies by a mandrel having a radially movable bearing which is moved towards the groove and rotated along the groove; said annular protrusion and said straddling portions having a uniform thickness; and applying a sealing heat to the protrusion and straddling portions, whereby the uniform thickness of the protrusion and straddling portions allows for uniform transfer of sealing heat therethrough.

15. An apparatus for use in mounting a tubular fitment to a flexible container comprising:

a mandrel having an elongated shaft having a cylindrical surface and a bearing mounted for reciprocal movement between an extended position extending outwardly from said shaft cylindrical surface and a retracted position generally retracted from said shaft cylindrical surface, at least said bearing of said mandrel being rotatable in a circular orbit about an axis extending through said shaft;

reciprocal means for reciprocally moving said bearing between said extended and retracted positions;

rotating means for rotating said bearing in a circular orbit; and a heat sealing die having a channel sized and shaped to receive a portion of the tubular fitment and a portion of the flexible container overlaying the fitment and having an annular groove in said channel in which said bearing may orbit.

16. The apparatus of claim 15 wherein said bearing is a ball.

17. The apparatus of claim 16 wherein said mandrel shaft has a channel and wherein said reciprocal mean comprises a cam mounted within said channel and means for moving said cam axially within said shaft channel to causes said ball to be reciprocally moved between its extended position and retracted positions.

18. The apparatus of claim 15 wherein said bearing comprises an annular array of balls.

19. The apparatus of claim 18 wherein said mandrel shaft has a channel and wherein said reciprocal mean comprises a cam mounted within said channel and means for moving said cam axially within said shaft channel to causes said balls to be reciprocally moved between their extended position and retracted positions.

20. A method of mounting a tubular fitment having a spout and a mounting skirt depending from the spout to a flexible container body, with the method comprising the steps of:

(a) positioning the fitment mounting skirt within the container body;

(b) positioning the fitment mounting skirt and a portion of the container body adjacent the mounting skirt between heat sealing dies that have a channel sized and shaped to receive the fitment and the adjacent portion of the container body;

(c) positioning a mandrel having a generally cylindrical shaft and at least one outwardly extending bearing within the fitment with the bearing aligned with the channel of the sealing dies;

(d) extending the bearing outwardly from the mandrel shaft against the interior of the mounting skirt thereby forcing the mounting skirt against the container body and the container body against the heat sealing dies;

(e) rotating the mandrel bearing so as to form an annular seal between the mounting skirt and the container body; and (f) removing the mandrel from the fitment and releasing the fitment and container body from the heat sealing dies.

21. The method of claim 20 wherein the fitment mounting skirt is positioned within the container body, then the fitment mounting skirt and a portion of the container body adjacent the mounting skirt are positioned between heat sealing dies that have a channel sized and shaped to receive the fitment and the adjacent portion of the container body; then a mandrel having a generally cylindrical shaft and at least one outwardly extending bearing is positioned within the fitment with the bearing aligned with the channel of the sealing dies; then the bearing is extended outwardly from the mandrel shaft against the interior of the mounting skirt thereby forcing the mounting skirt against the container body and the container body against the heat sealing dies; then the mandrel bearing is rotated so as to form an annular seal between the mounting skirt and the container body; and then the mandrel is removed from the fitment and releasing the fitment and container body form the heat sealing dies.

22. The method of claim 20 wherein the channel of the sealing dies has an annular groove and wherein a mandrel having a generally cylindrical shaft and at least one outwardly extending bearing is positioned within the fitment with the bearing aligned with the channel annular groove of the sealing dies.

23. The method of claim 22 wherein the bearing is an annular array of balls and wherein a mandrel having a generally cylindrical shaft and at least one outwardly extending bearing is positioned within the fitment with the bearing aligned with the channel of the sealing dies and wherein the bearing is extended outwardly from the mandrel shaft against the interior of the mounting skirt thereby forcing the mounting skirt against the container body and the container body against the heat sealing dies.

24. A product produced in accordance with the method of claim 23.

25. A product produced in accordance with the method of claim 20.

* * * * *